(12) United States Patent
Ulrich et al.

(10) Patent No.: US 11,660,960 B2
(45) Date of Patent: May 30, 2023

(54) OPERATING DEVICE FOR A TRANSPORTATION VEHICLE

(71) Applicant: VOLKSWAGEN AKTIENGESELLSCHAFT, Wolfsburg (DE)

(72) Inventors: Dominik Ulrich, Wolfsburg (DE); Eike Henning (Herbord) Mende, Wolfenbüttel (DE)

(73) Assignee: Volkswagen Aktiengesellschaft

( * ) Notice: Subject to any disclaimer, the term of this patent is extended or adjusted under 35 U.S.C. 154(b) by 181 days.

(21) Appl. No.: 16/639,615

(22) PCT Filed: Aug. 6, 2018

(86) PCT No.: PCT/EP2018/071288
§ 371 (c)(1),
(2) Date: Feb. 17, 2020

(87) PCT Pub. No.: WO2019/034466
PCT Pub. Date: Feb. 21, 2019

(65) Prior Publication Data
US 2020/0174638 A1    Jun. 4, 2020

(30) Foreign Application Priority Data

Aug. 18, 2017   (DE) .................... 10 2017 214 426.2

(51) Int. Cl.
*B60K 35/00* (2006.01)
*B60K 37/02* (2006.01)
(Continued)

(52) U.S. Cl.
CPC .............. *B60K 35/00* (2013.01); *B60K 37/02* (2013.01); *B60K 37/06* (2013.01); *B60R 16/037* (2013.01);
(Continued)

(58) Field of Classification Search
CPC ................ B60R 25/24; B60R 13/0243; B60R 16/037; B60R 2013/0287; G06F 3/044;
(Continued)

(56) References Cited

U.S. PATENT DOCUMENTS 7,170,400 B2   1/2007   Cowelchuk et al.
7,410,202 B2   8/2008   Rose et al.
(Continued)

FOREIGN PATENT DOCUMENTS

DE    10324918 A1    2/2004
DE    10352032 A1    6/2005
(Continued)

OTHER PUBLICATIONS

Search Report for International Patent Application No. PCT/EP2018/071288; dated Jan. 4, 2019.

*Primary Examiner* — Yaron Cohen
(74) *Attorney, Agent, or Firm* — Barnes & Thornburg, LLP

(57) ABSTRACT

An operating device for a transportation vehicle having at least one touch-sensitive operating area to display at least one operating symbol and to actuate at least one window lifter. The operating device, viewed from an imaginary installed state in the transportation vehicle, has an upper face and a front face adjoining the upper face, at least one touch-sensitive operating area for actuating a window lifter that is on at least part of the upper face and also on at least part of the front face.

15 Claims, 3 Drawing Sheets

(51) Int. Cl.
*B60K 37/06* (2006.01)
*B60R 16/037* (2006.01)
*B60R 25/24* (2013.01)
*G06F 3/041* (2006.01)
*G06F 3/044* (2006.01)
*G06F 3/0488* (2022.01)
*B60R 13/02* (2006.01)

(52) U.S. Cl.
CPC .............. *B60R 25/24* (2013.01); *G06F 3/044* (2013.01); *G06F 3/0412* (2013.01); *G06F 3/0488* (2013.01); *B60K 2370/143* (2019.05); *B60K 2370/1434* (2019.05); *B60K 2370/1438* (2019.05); *B60K 2370/1446* (2019.05); *B60K 2370/77* (2019.05); *B60K 2370/794* (2019.05); *B60R 2013/0287* (2013.01)

(58) Field of Classification Search
CPC ..... G06F 3/0412; G06F 3/0488; B60K 37/06; B60K 35/00; B60K 37/02; B60K 2370/77; B60K 2370/1434; B60K 2370/1438; B60K 2370/1446; B60K 2370/794; B60K 2370/1442; B60K 2370/143

See application file for complete search history.

(56) References Cited

U.S. PATENT DOCUMENTS

| | | |
|---|---|---|
| 7,518,381 B2 | 4/2009 | Lamborghini et al. |
| 2013/0187889 A1 | 7/2013 | Pandher et al. |
| 2013/0241720 A1* | 9/2013 | Ricci .................. G06F 3/04886 715/765 |
| 2013/0311039 A1 | 11/2013 | Washeleski et al. |
| 2016/0129851 A1 | 5/2016 | Werner |
| 2018/0239483 A1* | 8/2018 | Brombach .......... G06F 3/04847 |

FOREIGN PATENT DOCUMENTS

| | | |
|---|---|---|
| DE | 102005021541 A1 | 12/2005 |
| DE | 102005051786 A1 | 5/2006 |
| DE | 112005003178 T5 | 2/2008 |
| DE | 102012206661 A1 | 10/2013 |
| DE | 102014110195 A1 | 1/2015 |
| DE | 102014016570 A1 | 5/2016 |
| DE | 102015003204 A1 | 9/2016 |
| EP | 1818961 A1 | 8/2007 |
| KR | 100872742 B1 | 12/2008 |

* cited by examiner

OPERATING DEVICE FOR A TRANSPORTATION VEHICLE

PRIORITY CLAIM

This patent application is a U.S. National Phase of International Patent Application No. PCT/EP2018/071288, filed 6 Aug. 2018, which claims priority to German Patent Application No. 10 2017 214 426.2, filed 18 Aug. 2017, the disclosures of which are incorporated herein by reference in their entireties.

SUMMARY

Illustrative embodiments relate to an operating device for a transportation vehicle.

BRIEF DESCRIPTION OF THE DRAWINGS

Disclosed embodiments are represented in the figures and will be elucidated in more detail in the following description with reference to the figures. Identical reference symbols, also in different figures, relate to identical, comparable or functionally identical components. In this connection, corresponding or comparable properties are obtained, even if a repeated description or reference thereto does not occur. The figures are not always true to scale. In some figures, proportions may have been represented in exaggerated manner to emphasize features of an embodiment more clearly. Shown, in each instance schematically, are.

DETAILED DESCRIPTION

Figure 1:
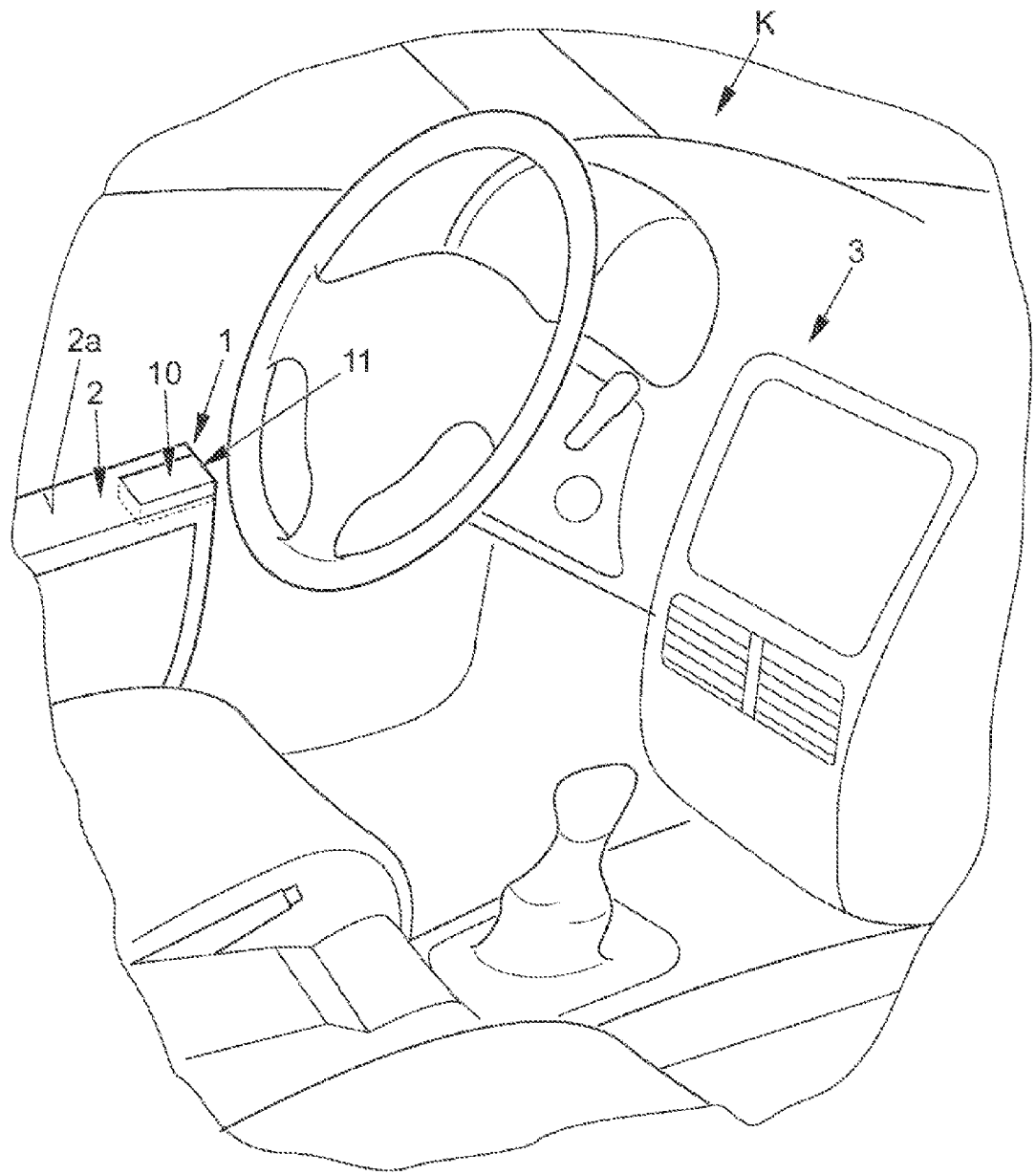
FIG. 1 illustrates a passenger compartment of a transportation vehicle in the region of the cockpit, with a disclosed operating device.

Disclosed embodiments relate to an operating device for a transportation vehicle.

An operating device of such a type has become known from DE 10 2014 016 570 A1. Specifically, this document discloses a transportation vehicle door with an arm support, on the upper side of which an operating device, such as a touchscreen, has been integrated. The touchscreen exhibits an operating panel which is capable of being switched over between several display modes. In the first display mode, operating symbols for selecting operable actuators (exterior mirrors, window regulators, seats and doors) are displayed; after selection of one of the operable actuators, a switch-over to a second display mode is implemented. In the second display mode, the touchscreen displays, in each instance, an operating symbol specific to the respectively selected, operable actuator.

In DE 103 24 918 A1 an operating device is disclosed for adjusting adjustable components of a transportation vehicle, the operating device exhibiting an operating area that is a pressure-sensitive area sensor. Furthermore, membrane pushbutton switches are present. By sliding motion of a finger over the operating area, an adjustment of a component can be implemented that correlates with the linear path of the implemented touching.

Finally, an operating device for actuating window regulators is described in DE 10 2005 051 786 A1. In this case, two opening/closing switches are present for opening and closing, in each instance, two windows at the front or at the back. In the vicinity of the opening/closing switches a selector switch is arranged for switching over between the actuation of the front or the rear windows.

In view of this state of the art, the disclosed embodiments make available an operating device for a transportation vehicle that enables a convenient operation of the windows of the transportation vehicle and that is of compact design.

This is achieved by an operating device for a transportation vehicle.

The disclosure takes as its starting-point an operating device for a transportation vehicle, having at least one touch-sensitive operating region. The touch-sensitive operating region serves for displaying at least one operating symbol and for actuating at least one window regulator.

The touch-sensitive operating region may be a touchscreen, though a different design of the operating region, for instance, a touchpad, is entirely conceivable.

The disclosure now proposes that the operating device, viewed in an imaginary mounted state in the transportation vehicle, exhibits an upper side and a front side adjacent thereto. The upper side accordingly faces toward a headliner of the transportation vehicle, and the front side faces toward an instrument panel or a windshield.

At least one touch-sensitive operating region for actuating a window regulator is arranged both at least on one part of the upper side and at least on one part of the front side.

By virtue of these features, the basic prerequisites are created so that the operating device can be kept very compact and hence space-saving in the x-direction—that is to say, in the longitudinal direction of a transportation vehicle. For by virtue of the arrangement of touch-sensitive operating regions for actuating windows on the front side and on the upper side, conventional finger depressions in the region of the opening/closing switches for the windows, or additional operating areas, can be avoided.

A further disclosed embodiment proposes that all the sides of the operating device extending downward from the upper side include an angle of at most 90 degrees with the upper side. These features constitute the basic prerequisite so that the operating device can be produced without undercuts and therefore with low tooling costs. Otherwise necessary slides and such like in a tool can be dispensed with. The supporting structure (body) of the operating device may be produced in a plastics injection-molding method. The body of the operating device is accordingly formed in one piece, reducing the manufacturing effort.

To enable an agreeable operation of the operating device, it is further proposed that the at least one touch-sensitive operating region located on the upper side for actuating the window regulators includes an angle that is less than 90 degrees with the at least one operating region located on the front side for actuating the window regulators. This angle may lie within a range from about 60 degrees to 80 degrees.

A further disclosed embodiment proposes that touch-sensitive operating regions are present which serve either for actuating the front window regulators or for actuating the rear window regulators, in which case a touch-sensitive operating region is likewise present for switching over between an actuation of the front window regulators or of the rear window regulators. In this way, it is made possible to make do with a minimum of operating regions. Accordingly, separate operating regions do not have to be provided for operating the front and the rear window regulators. This leads likewise to a reduction of the space requirement of the operating device.

In the following, further developments of the operating device will be presented which in each instance lead to a simplification of operation or in each instance to a more intuitive understanding in operation.

Accordingly, the following further disclose embodiments are conceivable:

By a wiping motion and/or by a double tapping, which in each instance is executed on the at least one touch-sensitive operating region for actuating at least one window regulator, at least one window is capable of being opened or closed in a continuous action. In this connection, the continuous action can be terminated by a single tapping on the at least one touch-sensitive operating region for actuating at least one window regulator.

By a sustained touching contact on the at least one touch-sensitive operating region for actuating at least one window regulator, at least one window is capable of being opened or closed in a manual action. In this connection, the manual action of the at least one window can be terminated by a lifting of a touching element away from the at least one touch-sensitive operating region for actuating at least one window regulator.

By a double tapping on the touch-sensitive operating region for switching actuation over between the front window regulators and the rear window regulators, and by a subsequent touching of at least one touch-sensitive operating region for actuating the window regulators, all the windows are capable of being opened or closed simultaneously. By virtue of this operation, a very comfortable ventilation function is accordingly achievable.

At least one touch-sensitive operating region is present for locking or unlocking all the doors of the transportation vehicle. In this connection, the locking is capable of being implemented by a single tapping on the touch-sensitive operating region for locking or unlocking all the doors of the transportation vehicle, or even by simultaneous touching of several touch-sensitive operating regions of the operating device. An unlocking can be implemented by single tapping on the touch-sensitive operating region for locking or unlocking all the doors of the transportation vehicle.

In a further disclosed embodiment, the following features are also proposed for the purpose of facilitating operability:

By a wiping motion contrary to a direction of travel and/or by a double tapping, which in each instance is executed on the at least one touch-sensitive operating region located on the upper side for actuating the window regulators, at least one window is capable of being opened in a continuous action. In this connection, the continuous action is capable of being terminated by a touching of at least one touch-sensitive operating region located on the upper side for actuating the window regulators.

By a sustained touching contact on the at least one touch-sensitive operating region located on the upper side for actuating the window regulators, at least one window is capable of being opened in a manual action. The manual action of the at least one window can be terminated by a lifting of a touching element away from the at least one touch-sensitive region located on the upper side for actuating the window regulators.

By a wiping motion upward in the direction of the upper side and/or by a double tapping, which in each instance is executed on the at least one touch-sensitive operating region located on the front side for actuating the window regulators, at least one open window can be closed in a continuous action.

By a touching of the at least one touch-sensitive operating region located on the front side for actuating the window regulators, the continuous action can be terminated.

By a sustained touching on the at least one touch-sensitive operating region located on the front side for actuating the window regulators, at least one window is capable of being closed in a manual action. By a lifting of a touching element away from the at least one touch-sensitive region located on the front side for actuating the window regulators, the manual action of the at least one window can be terminated.

It is also conceivable that, by virtue of a touching of the at least one touch-sensitive operating region located on the front side for actuating the window regulators, followed by a touching of the at least one touch-sensitive operating region located on the upper side for actuating the window regulators, at least one window is capable of being closed in a continuous action.

With the disclosed embodiments, a transportation vehicle that is equipped with at least one disclosed operating device is to be accorded protection.

Reference will firstly be made to FIG. 1, in which the passenger compartment of a transportation vehicle K in the region of its cockpit is evident. The transportation vehicle K exhibits on its door an arm support 2, into which an operating device 1 has been integrated.

In the represented mounted position of the operating device 1, merely an upper side 10 of its body is evident The upper side 10 is oriented approximately flush with an upper side 2*a* of the arm support 2. At least, upper side 10 does not protrude appreciably from upper side 2*a*. Moreover, a front side 11 is freely accessible and capable of being touched by fingers of an operator. A touching of the front side 11 can be effected in extremely simple manner by an operator positioning his/her left hand above or on the upper side 10. In this connection, his/her downwardly directed fingers have simultaneously been automatically positioned over the front side 11. A touching of the front side 11 and hence an operation of operating elements that are present there is accordingly very readily possible.

In the mounted state represented, the upper side 10 is directed toward a roof liner, not represented in any detail, of the transportation vehicle K, and the front side 11 is directed toward an instrument panel 3 or a windshield located behind it.

Figure 2:
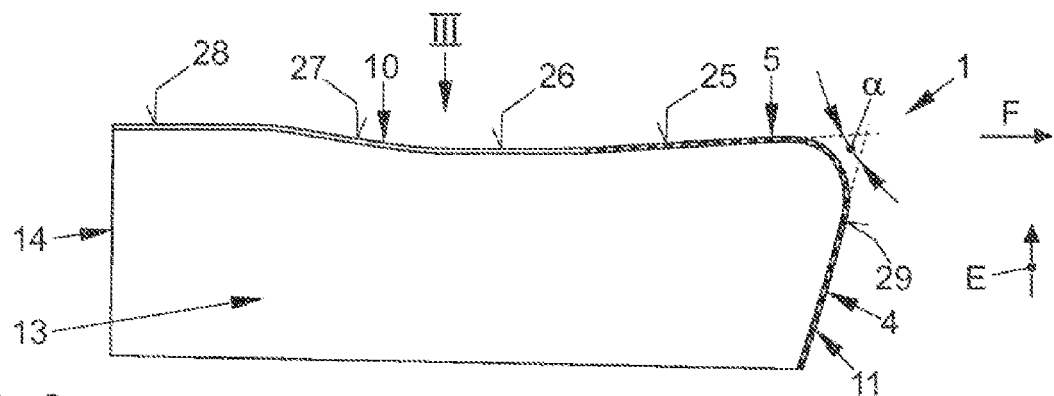
FIG. 2 shows a side view of the body of the operating device.

In the following, reference will be made to FIGS. 2 to 4, which show the body of the operating device 1 in isolation. The body of the operating device 1 is made of plastic and has been produced in one piece—that is to say, from one piece—in a plastics injection-molding method.

As is evident, the operating device exhibits an upper side 10, a front side 11, a left side 12 and a right side 13, in an imaginary direction of travel F. A back side is numbered 14.

Furthermore, several touch-sensitive operating regions 25, 26, 27 and 28 are arranged on the upper side 10.

Within operating region 25, operating symbols 15 and 16 are present for actuating a window regulator on the left side, in the direction of travel, of the transportation vehicle K, and operating symbols 17 and 18 are present for actuating a window regulator on the corresponding right side of the transportation vehicle K. Furthermore, an operating symbol 19 is present with which a switch-over is possible between an actuation of the front window regulators and an operation of the rear window regulators at the rear of the transportation vehicle K, and conversely.

Equally, on the front side 11, within a touch-sensitive operating region 29, operating symbols 15a and 17a are present which likewise serve for actuating the window regulators.

It is also conceivable that the individual touch-sensitive operating regions 25 to 29, or one contiguous touch-sensitive operating region, is/is not a touchscreen but has/have been designed as a touchpad. In this case, the operating symbols may be, in straightforward manner, symbols capable of being illuminated from behind, which are backlit, or not, depending upon the operating mode or display mode.

Operating symbols 20 and 21 serve for initiating the adjustment of an adjustable exterior mirror on the left side or on the right side.

Via an operating symbol 22, a heater of the exterior mirrors can be activated. Furthermore, via an operating symbol 23 a child safety lock (deactivation of a possible actuation of windows and doors at the rear of the transportation vehicle) is capable of being activated, and with an operating symbol 24 a simultaneous locking of all the doors is possible.

Since the stated operating symbols are all located respectively on touch-sensitive operating regions, a touching of the operating symbols, as will be described in more detail in the following, is sufficient for operating the correspondingly assigned functions.

In a departure from the exemplary embodiment, it is conceivable that several touch-sensitive operating regions have been combined to form a larger touch-sensitive operating region. It is also conceivable to replace the touch-sensitive operating regions 25 to 29 with a single touch-sensitive operating region. On the other hand, it is also conceivable that a touch-sensitive operating region has been assigned to each operating symbol.

Attention is also to be drawn expressly to the fact that the operating device 1 or its body has been designed in such a manner that all the sides 11, 12, 13 and 14 extending downward from the upper side 10 include with the upper side 10 an angle that amounts to at most 90 degrees and is optionally less than 90 degrees. In other words, the body of the operating device 1 has been designed in such a way that it is capable of being produced in one piece by a plastics injection-molding method and capable of being readily demolded from the tool in a mold-release direction E.

By way of example, angles $\beta$ have been drawn in that sides 12 and 13 respectively include with the upper side 10.

An angle that the imaginary extensions of touch-sensitive operating regions 25 and 29 form with one another has been identified by $\alpha$. By such a configuration of the angle $\alpha$, very good haptics and operability of the operating device 1 can be achieved.

The operation of the operating device 1 can now be implemented in the following way:

Operation of the Window Regulators:

By a wiping motion contrary to an imaginary direction of travel F, and/or by a double tapping, which in each instance is executed on the at least one touch-sensitive operating region 25 located on the upper side 10 for actuating the window regulators, at least one window can be opened in a continuous action. Accordingly, if an operator performs such a wiping motion in the region of operating symbols 15 and/or 16, in the display mode represented the window of the driver's left door is opened in a continuous action. By a touching of operating region 25 in the region of symbols 15 and/or 16, the continuous action can be terminated at any time.

By a sustained touching contact (that is to say, tapping and holding) on the at least one touch-sensitive operating region 25 located on the upper side 10, it is possible to open at least one window in a manual action. By a lifting of the touching element away from the at least one touch-sensitive operating region 25 located on the upper side 10, the manual action of the at least one window is terminated. Accordingly, if an operator taps on operating region 25 in the region of operating symbols 15 and/or 16 and keeps his/her finger on operating region 25, a manual opening action of the window of the driver's door starts. If the operator lets go of operating region 25, the manual action is stopped.

The operation of the window of the passenger door is undertaken analogously via operating symbols 17 and 18.

If a closing of an open window is desired by the operator, by a wiping touching of touch-sensitive operating region 29 in the region of operating symbols 15a upward—that is to say, in the direction of the arrows represented by operating symbols 15a or 17a—he/she can close an open window in a continuous action. Accordingly, if an operator performs an upwardly directed wiping motion on operating symbol 15a, an open window of a driver's door is closed again in a continuous action.

If a manual closing movement of an open window is to be implemented, operating region 29 has to be touched in a sustained touching in the region of operating symbols 15a or 17a. Accordingly, if an operator touches, for instance, operating symbol 15a and leaves his/her finger in contact with operating region 29, the open window on the driver's side commences a closing motion and runs until such time as the window has been closed completely or until the operator previously lifts his/her finger away again from operating symbol 15a.

It will be understood that the operation of the window regulators both on the driver's side and on the passenger side takes place in the same way.

If an operation of the rear windows at the rear of the transportation vehicle K is desired by the operator, a touching of operating symbol 19 is sufficient. In this case, a brighter or differently-colored illumination of operating symbol 19 (so-called toggle function) takes place, to draw attention to the activated operability of the rear windows. The operation of the rear windows is then possible in a manner analogous to the operation of the front windows.

The subsequent switch-over to operability of the front windows again can be undertaken by renewed tapping on operating symbol 19, whereupon the backlighting of operating symbol 19 is deactivated again. But it is also conceivable to have the switching over to front operation implemented via a timing system. That is to say, after expiration of a defined or definable time the operability changes automatically from rear operation to front operation again.

By virtue of the front side 11, exposed in the mounted position, with touch-sensitive operating region 29 which merges with touch-sensitive operating region 25 of the upper side 10, the operating device 1 is capable of being realized so as to be very space-saving in the X-direction (longitudinal direction of the transportation vehicle K). Besides, by virtue of the represented configuration, a "pull to close" operation, required for safety reasons, is possible in very space-saving manner.

Finally, in connection with the operation of the window regulators an unusually beneficial ventilation function is also to be pointed out:

If an operator touches operating symbol 19 by a double tapping (that is to say, brief tapping twice), operating symbol 19 starts to flash for a short time, optionally for approximately 5 seconds. If during this time the operator touches one of operating symbols 15, 16, 17 and/or 18, all the windows are opened simultaneously.

If the operator desires a simultaneous closing of all the open windows, he/she can bring this about analogously by touching operating symbol 19 likewise by a double tapping and by subsequently touching one of operating symbols 15*a* and/or 17*a* by tapping on it within a defined waiting-period.

Incidentally, the start of a continuous action for opening a window by a double tapping of operating symbols 15 and/or 16, or 17 and/or 18, is also conceivable. A closing of a window in a continuous action is equally conceivable by double tapping of operating symbols 17*a* and/or 15*a*.

Mirror Adjustment:

The selection of an exterior mirror to be adjusted is undertaken by touching either operating symbol 20 (left exterior mirror) or operating symbol 21 (right exterior mirror).

If an operator touches operating symbol 21, for instance, the representation or visibility of the operating symbols changes to another display mode or operating mode.

Figure 5:
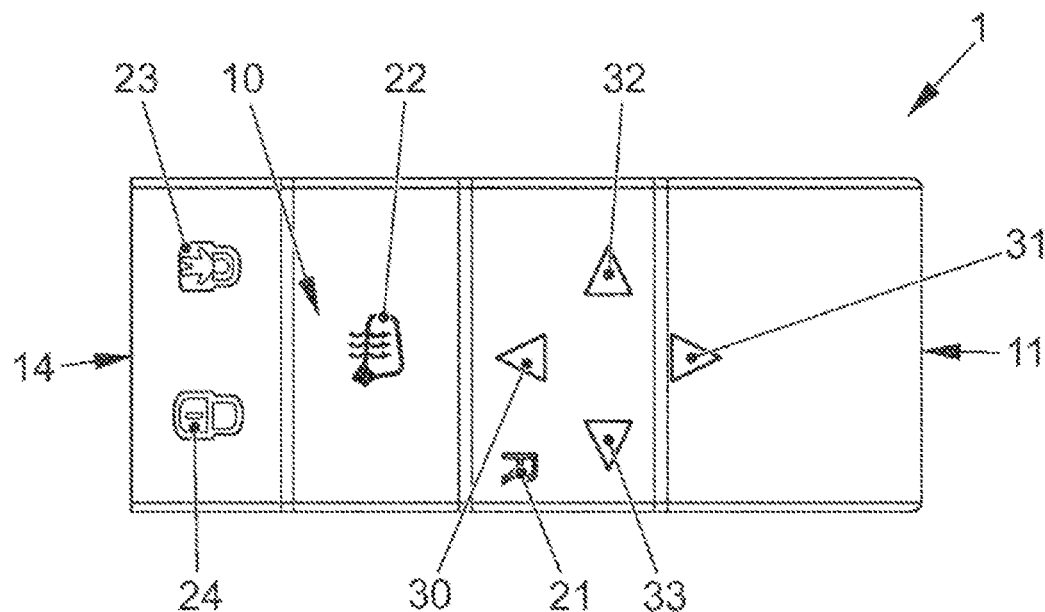
FIG. 5 illustrates a view of the operating device comparable to the view from FIG. 3, but in another operating-and-display mode.

This is represented in FIG. 5. It is evident therein that operating symbols 15 to 19 have disappeared or are no longer visible, and other arrow-like operating symbols 30, 31, 32 and 33 are apparent. Specifically, by touching operating symbols 32 and 33 an adjustment of the right exterior mirror about a vertical swivel axis can be brought about, and by touching operating symbols 30 and 31 an adjustment of the right exterior mirror about a horizontal swivel axis can be brought about. The adjustment of the left exterior mirror takes place analogously after touching operating symbol 20 (compare FIG. 3).

Figure 3:
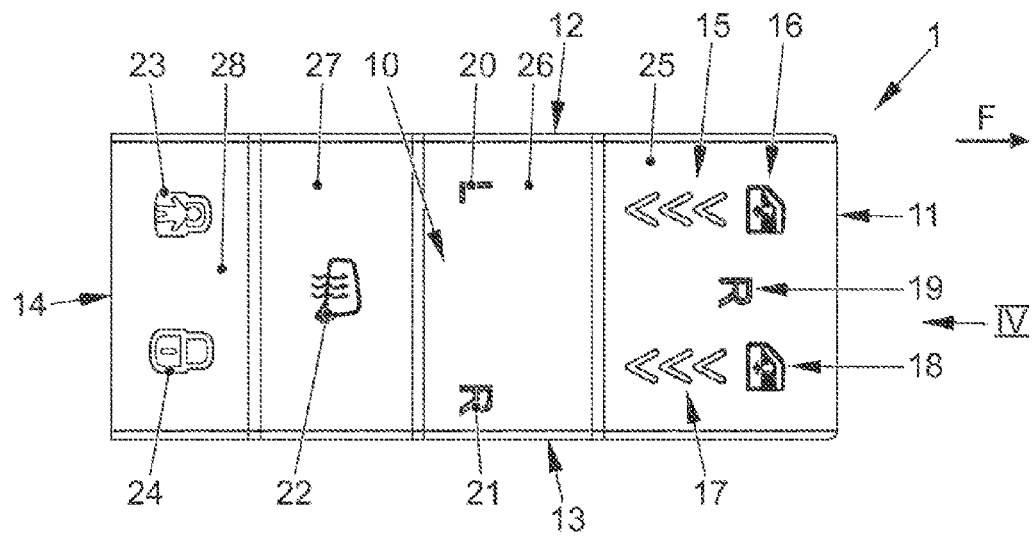
FIG. 3 illustrates a representation of the operating device according to view III of FIG. 2.
Figure 4:
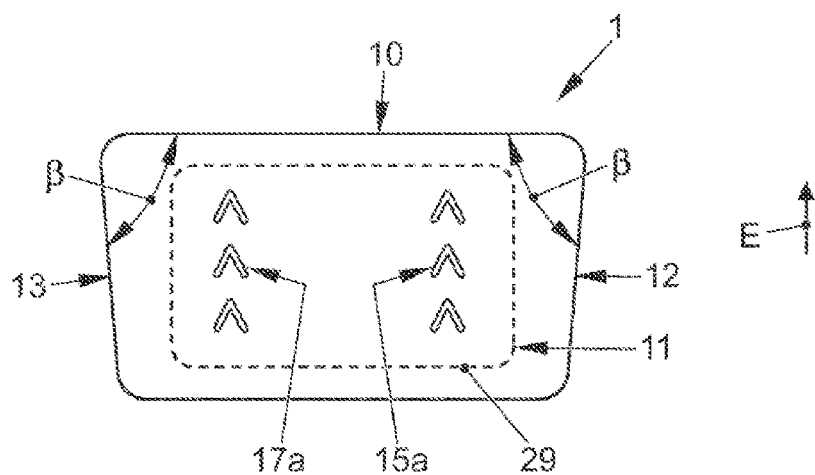
FIG. 4 illustrates a representation of the operating device according to view IV of FIG. 3.
Figure 6:
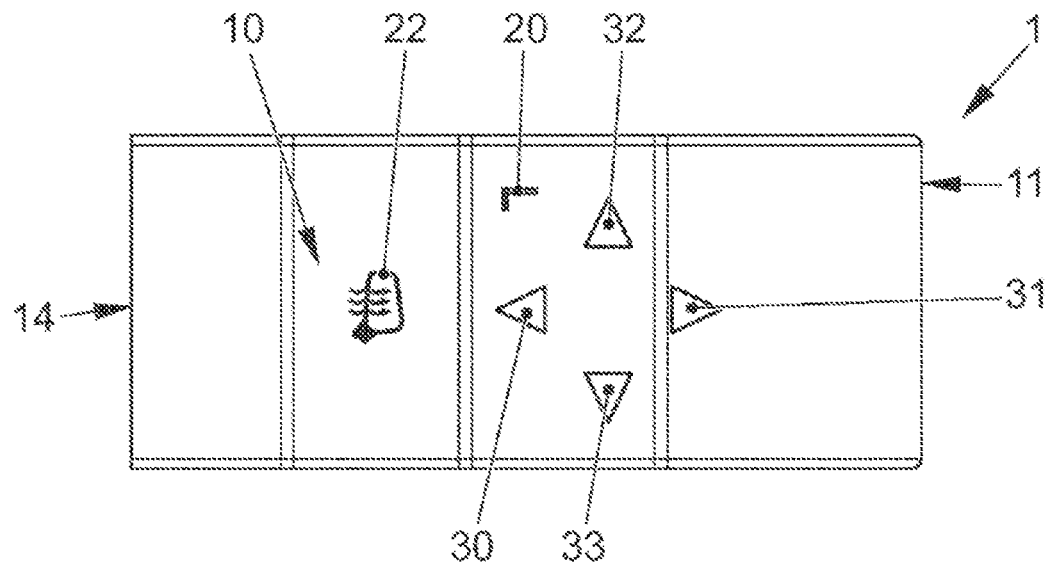
FIG. 6 illustrates a representation comparable to FIG. 3, but in another conceivable display-and-operating mode.

FIG. 6 shows an operating mode in which the adjustment of the left exterior mirror was selected via operating symbol 20 (cf. FIG. 3). In contrast to FIG. 5, in this case operating symbols 23 and 24 are also no longer apparent as a possible option.

Door-Locking Function (Lock/Unlock Function):

It is also worth mentioning that the transportation vehicle K can be completely locked not only by a tapping on operating symbol 24 but also by simultaneous tapping on two or more of the aforementioned operating symbols. By this, it is made possible for an operator to be able to lock the transportation vehicle K without any problems even in a panic situation.

LIST OF REFERENCE SYMBOLS

1 operating device
2 arm support
2*a* upper side
3 instrument panel
10 upper side
11 front side
12 left side
13 right side
14 back side
15-24 operating symbols
15*a*, 17*a* operating symbols
25-29 touch-sensitive operating regions
30-33 operating symbols
E mold-release direction
F direction of travel
K transportation vehicle
α angle
β angle

The invention claimed is:

1. An operating device for a transportation vehicle the operating device comprising: at least one touch-sensitive operating region which displays at least one operating symbol and actuates at least one window regulator, wherein the operating device, viewed in a mounted state in the transportation vehicle, exhibits an upper side and a front side adjacent thereto, and wherein at least one touch-sensitive operating region for actuating a window regulator is arranged both at least on a part of the upper side and at least on a part of the front side, wherein a maximum angle of 90 degrees is formed between the upper side and the front side, and wherein the at least one touch-sensitive operating region is a touchscreen, wherein the at least one touch-sensitive operating region positioned on the upper side is oriented approximately flush with an upper side of an arm support, and the at least one touch-sensitive operating region positioned on the front side is oriented on the front side of the arm support facing a direction of a windshield.

2. The operating device of claim 1, wherein the at least one touch-sensitive operating region located on the upper side for actuating the window regulators includes with the at least one operating region located on the front side for actuating the window regulators an angle that is less than 90 degrees.

3. The operating device of claim 1, wherein touch-sensitive operating regions are present which serve either for actuating the front window regulators or for actuating the rear window regulators, wherein a touch-sensitive operating region is present for switching over between an actuation of the front window regulators or of the rear window regulators.

4. The operating device of claim 1, wherein at least one window is capable of being opened or closed in a continuous action by a wiping motion and/or by a double tapping which is executed on the at least one touch-sensitive operating region for actuating at least one window regulator.

5. The operating device of claim 4, wherein the continuous action is terminated by a single tapping on the at least one touch-sensitive operating region for actuating at least one window regulator.

6. The operating device of claim 1, wherein at least one window is opened or closed in a manual action by a sustained touching contact on the at least one touch-sensitive operating region for actuating at least one window regulator.

7. The operating device of claim 6, wherein the manual action of the at least one window is terminated by a lifting of a touching element away from the at least one touch-sensitive operating region for actuating at least one window regulator.

8. The operating device of claim 3, wherein all the windows are opened or closed simultaneously by a double tapping on touch-sensitive operating region for switching actuation over between the front window regulators and the rear window regulators and by a subsequent touching of at least one touch-sensitive operating region for actuating the window regulators.

9. The operating device of claim 1, wherein at least one touch-sensitive operating region is present for locking or unlocking all the doors of the transportation vehicle, and wherein the locking is implemented by single tapping on touch-sensitive operating region for locking or unlocking all the doors of the transportation vehicle or by simultaneous touching of several touch-sensitive operating regions, and wherein the unlocking is implemented by single tapping on touch-sensitive operating region for locking or unlocking all the doors of the transportation vehicle.

10. The operating device of claim 2, wherein the at least one touch-sensitive operating region located on the upper side for actuating the window regulators includes with the at least one operating region located on the front side for actuating the window regulators an angle that lies within a range from approximately 60 degrees to approximately 80 degrees.

11. A transportation vehicle, comprising: at least one operating device with at least one touch-sensitive operating region which displays at least one operating symbol and actuates at least one window regulator, wherein the operating device, viewed in a mounted state in the transportation vehicle, exhibits an upper side and a front side adjacent thereto, and wherein at least one touch-sensitive operating region for actuating a window regulator is arranged both at least on a part of the upper side and at least on a part of the front side, wherein a maximum angle of 90 degrees is formed between the upper side and the front side, and wherein the at least one touch-sensitive operating region is a touchscreen, further comprising an arm support, wherein the at least one touch-sensitive operating region positioned on the upper side is oriented approximately flush with an upper side of the arm support, and the at least one touch-sensitive operating region positioned on the front side is oriented on the front side of the arm support facing a direction of a windshield.

12. A method for enabling operation of a transportation vehicle using an operating device for the transportation vehicle, wherein the method comprising: displaying, using at least one touch-sensitive operating region, at least one operating symbol to actuate at least one window regulator, wherein the operating device, viewed in a mounted state in the transportation vehicle, exhibits an upper side and a front side adjacent thereto, and wherein at least one touch-sensitive operating region for actuating a window regulator is arranged both at least on a part of the upper side and at least on a part of the front side, wherein a maximum angle of 90 degrees is formed between the upper side and the front side, and wherein the at least one touch-sensitive operating region is a touchscreen, further comprising an arm support, wherein the at least one touch-sensitive operating region positioned on the upper side is oriented approximately flush with an upper side of the arm support, and the at least one touch-sensitive operating region positioned on the front side is oriented on the front side of the arm support facing a direction of a windshield.

13. The method of claim 12, wherein the at least one touch-sensitive operating region located on the upper side for actuating the window regulators includes with the at least one operating region located on the front side for actuating the window regulators an angle that is less than 90 degrees.

14. The method of claim 12, wherein a portion of the at least one touch-sensitive operating region positioned on the upper side is located in a different plane than a portion of the at least one touch-sensitive operating region positioned on the front side.

15. The operating device of claim 1, wherein a portion of the at least one touch-sensitive operating region positioned on the upper side is located in a different plane than a portion of the at least one touch-sensitive operating region positioned on the front side.

* * * * *